United States Patent
Johnson

(10) Patent No.: US 12,432,255 B2
(45) Date of Patent: Sep. 30, 2025

(54) SYSTEMS AND METHODS FOR CONTROLLING ACCESS TO AN UNADVERTISED CLOUD-BASED RESOURCE

(71) Applicant: Fortinet, Inc., Sunnyvale, CA (US)

(72) Inventor: Isaac Michael Johnson, Roselle, IL (US)

(73) Assignee: Fortinet, Inc., Sunnyvale, CA (US)

(*) Notice: Subject to any disclaimer, the term of this patent is extended or adjusted under 35 U.S.C. 154(b) by 675 days.

(21) Appl. No.: 17/831,155

(22) Filed: Jun. 2, 2022

(65) Prior Publication Data
US 2023/0328107 A1 Oct. 12, 2023

Related U.S. Application Data

(62) Division of application No. 17/719,228, filed on Apr. 12, 2022.

(51) Int. Cl.
*H04L 9/40* (2022.01)

(52) U.S. Cl.
CPC .......... *H04L 63/20* (2013.01); *H04L 63/0281* (2013.01); *H04L 63/0428* (2013.01); *H04L 63/08* (2013.01); *H04L 63/102* (2013.01)

(58) Field of Classification Search
CPC . H04L 63/20; H04L 63/0281; H04L 63/0428; H04L 63/08; H04L 63/102
See application file for complete search history.

(56) References Cited

U.S. PATENT DOCUMENTS

| | | | | |
|---|---|---|---|---|
| 7,954,144 | B1* | 5/2011 | Ebrahimi | H04L 67/02 709/227 |
| 8,745,709 | B2* | 6/2014 | Narendra | H04L 63/0227 713/168 |
| 10,171,463 | B1* | 1/2019 | Wiger | H04L 63/126 |
| 10,547,599 | B1* | 1/2020 | Mehta | H04L 63/08 |
| 2002/0036983 | A1* | 3/2002 | Widegren | H04L 65/103 370/230.1 |
| 2011/0265168 | A1* | 10/2011 | Lucovsky | H04L 63/20 709/223 |
| 2016/0087957 | A1* | 3/2016 | Shah | H04L 63/205 726/1 |
| 2018/0213002 | A1* | 7/2018 | Figovsky | G06F 21/53 |
| 2020/0151339 | A1* | 5/2020 | Silverstone | H04L 63/20 |
| 2021/0014224 | A1* | 1/2021 | Gordon | H04L 63/102 |
| 2022/0129284 | A1* | 4/2022 | Zhou | G06F 8/71 |

OTHER PUBLICATIONS

Office Action for U.S. Appl. No. 17/719,228, mailed Nov. 21, 2024, 17 pages.
Notice of Allowance for U.S. Appl. No. 17/719,228, mailed Mar. 6, 2025, 7 pages.

* cited by examiner

*Primary Examiner* — Javier O Guzman
(74) *Attorney, Agent, or Firm* — Jaffery Watson Hamilton & DeSanctis LLP

(57) ABSTRACT

Systems, devices, and methods are discussed for context protected access to an unadvertised cloud-based resource.

20 Claims, 7 Drawing Sheets

SYSTEMS AND METHODS FOR CONTROLLING ACCESS TO AN UNADVERTISED CLOUD-BASED RESOURCE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for network security, and more particularly to systems and methods for providing context protected access to an unadvertised cloud-based resource.

BACKGROUND

Many enterprises today employ air-gapped networks and resources, especially when accessing management functions over a potentially untrusted enterprise network. Access to such air-gapped networks are provided by a jump server or bridge server. Traditional bridge servers are typically hardened/lean Linux boxes using secure socket shell (SSH) tunnels to management targets; additionally, there may be small IP tables configurations on these servers, but no more. As such, there is no way to inspect traffic to/from the air-gapped networks. In the past this has not been a problem because of the highly limited access to the air-gapped networks. However, as threat capability is increasing, reliance on isolation alone is becoming less acceptable.

Hence, there exists a need in the art for novel systems and methods for providing security to air-gapped networks and resources.

SUMMARY

Various embodiments provide context protected access to an unadvertised cloud-based resource.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
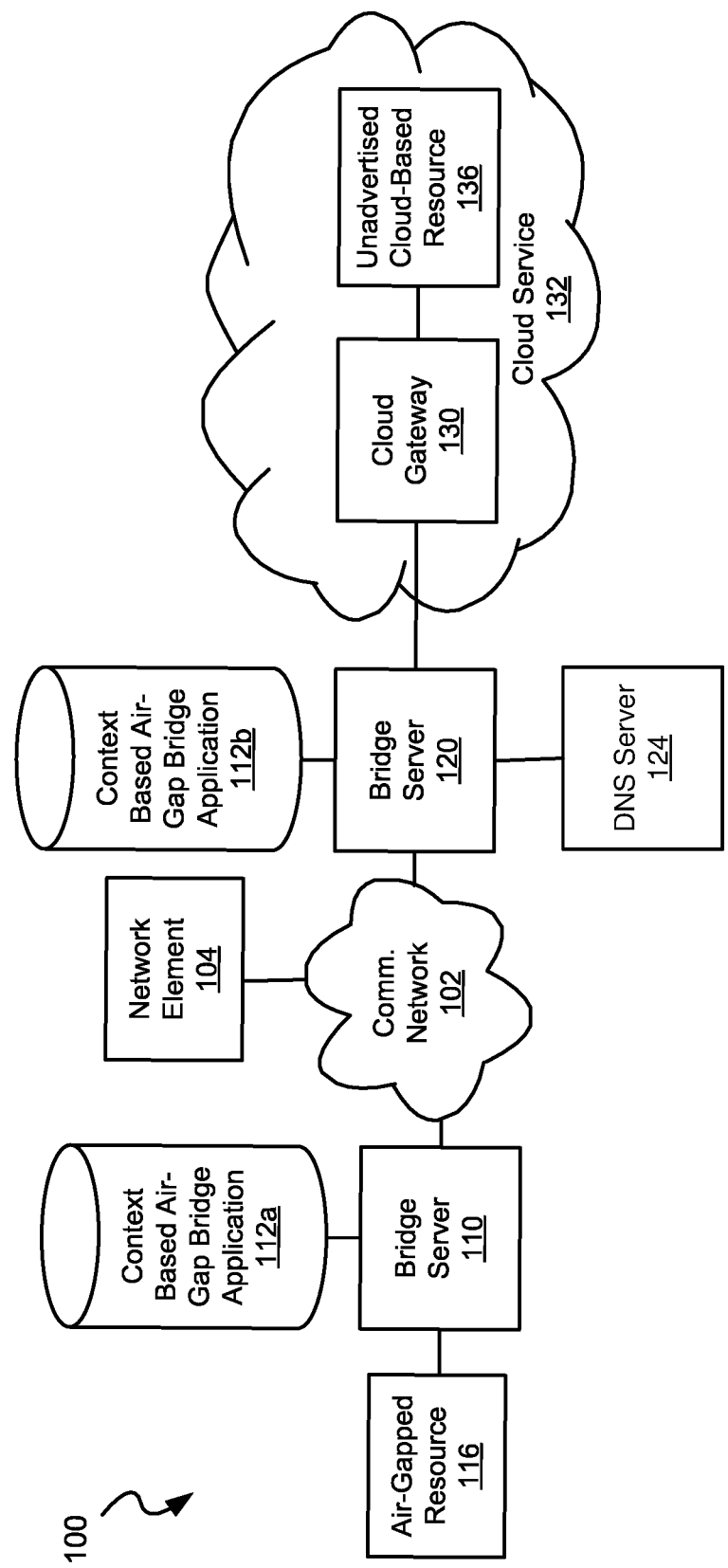
FIGS. 1A-1C illustrate a network architecture including bridge servers executing context based air-gap bridge application in accordance with some embodiments.

Various embodiments provide context protected access to an unadvertised cloud-based resource.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, an "air-gapped" network element, computer, or resource is any network element, computer, or resource that is isolated from outside networks by, for example, being accessible only with permission from a single designated hardware contact such as a bridge server, or not being advertised in any Domain Name System. Based upon the disclosure provided herein, one of ordinary skill in the art will recognize a variety of air-gapped network elements, computers, and/or resources that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for providing access to an unadvertised cloud-based resource. The methods include: receiving, by a processing resource, a request to access a proxy from a first network entity; creating, by the processing resource, a temporary name to be used in relation to accessing a resource corresponding to the proxy; receiving, by the processing resource, a request to access the resource from a second network entity, wherein the request includes the temporary name; requesting, by the processing resource, authentication from the second network entity; and based upon an acceptable authentication received from the second network entity, establishing a connection with the resource. In various instances of the aforementioned embodiments, the actual name of the resource is never revealed to the first network entity. In some instances of the aforementioned embodiments, the first network entity is a domain name server, and wherein the processing resource is included in a bridge server.

In some instances of the aforementioned embodiments, the connection with the resource is established directly between the resource and the second network entity. In other instances of the aforementioned embodiments, the connection with the resource is established indirectly between the resource and the second network entity with information flowing through a bridge server that includes the processing resource. In some such instances, the actual name of the resource is never revealed to the second network entity.

In various instances of the aforementioned embodiments where the request to access the proxy from the first network entity is a first request to access the proxy from the first network entity, the temporary name to be used in relation to accessing the resource corresponding to the proxy is a first temporary name to be used in relation to accessing the resource corresponding to the proxy, and the request to access the resource is a first request to access the resource, the methods further include: receiving, by the processing resource, a second request to access the proxy from the first network entity; creating, by the processing resource, a second temporary name to be used in relation to accessing the resource corresponding to the proxy; receiving, by the processing resource, a second request to access the resource from a third network entity, wherein the second request includes the second temporary name; requesting, by the processing resource, authentication from the third network entity; and based upon an failed authentication received from the third network entity, rendering, by the processing resource, the second temporary name unusable. In some such cases, rendering the second temporary name unusable includes deleting the second temporary name.

In some instances of the aforementioned embodiments, the methods further include: determining, by the processing resource, a time based expiration of the temporary name; and rendering, by the processing resource, the first temporary name unusable. In various instances of the aforementioned embodiments, the methods further include providing, by the processing resource, the temporary name to the first network entity for forwarding by the first network entity to the second network entity.

Other embodiments provide systems for providing access to an unadvertised cloud-based resource. Such systems include a processing resource, and a non-transient computer readable medium coupled to the processing resource. The non-transient computer readable medium has stored therein instructions that when executed by the processing resource cause the processing resource to: receive a request to access a proxy from a first network entity; create a temporary name to be used in relation to accessing a resource corresponding to the proxy; receive a request to access the resource from a second network entity, wherein the request includes the temporary name; request authentication from the second network entity; and based upon an acceptable authentication received from the second network entity, establish a connection with the resource.

Additional embodiments provide non-transient computer readable media having stored therein instructions that when executed by the processing resource cause the processing resource to: receive a request to access a proxy from a first network entity; create a temporary name to be used in relation to accessing a resource corresponding to the proxy; receive a request to access the resource from a second network entity, wherein the request includes the temporary name; request authentication from the second network entity; and based upon an acceptable authentication received from the second network entity, establish a connection with the resource.

Yet other embodiments provide methods for performing context based security for an isolated network element. Such methods include: resolving, by a processing resource, a requested resource using a proxy included in a received command; accessing, by the processing resource, a security policy associated with the requested resource; analyzing, by the processing resource, the received command based at least in part on a context of the received command and the security policy; and based upon a determination that the received command is acceptable, transferring a communication corresponding to the command to the requested resource.

In some instances of the aforementioned embodiments, the communication corresponding to the command includes a command component of the received command. In some such instances, the communication corresponding to the command additionally includes a source address identifying a bridge server that includes the processing resource. In other such instances, the communication corresponding to the command additionally includes a source address identifying a source of the received command.

In various instances of the aforementioned embodiments where the received command is a first received command and the proxy is a first proxy, the methods further include: resolving, by the processing resource, the requested resource using a second proxy included in a second received command; accessing, by the processing resource, the security policy associated with the requested resource; analyzing, by the processing resource, the second received command based at least in part on a context of the second received command and the security policy; and based upon a determination that the second received command is not acceptable, deleting the second received command. In some instances of the aforementioned embodiments, the requested resource is an air-gapped resource accessible only by a bridge server that includes the processing resource. In one or more instances of the aforementioned embodiments, the security policy applies at least one context based decision, and wherein the context based decision is based upon a context selected from including one or more of: an identity of an individual generating the received command, an origin of the received command, a submission time of the received command, and/or an intent of the command. In various instances of the aforementioned embodiments, the methods further include: receiving, by the processing resource, an encrypted information packet from a network element via a communication network; and decrypting, by the processing resource, the encrypted information packet to yield the received command.

Further embodiments provide systems for performing context based security for an isolated network element. Such systems include a processing resource, and a non-transient computer readable medium coupled to the processing resource. The non-transient computer readable medium has stored therein instructions that when executed by the processing resource cause the processing resource to: resolve a requested resource using a proxy included in a received command; access a security policy associated with the requested resource; analyze the received command based at least in part on a context of the received command and the security policy; and based upon a determination that the received command is acceptable, transfer a communication corresponding to the command to the requested resource.

Yet other embodiments provide non-transient computer readable media having stored therein instructions that when executed by the processing resource cause the processing resource to: resolve a requested resource using a proxy included in a received command; access a security policy associated with the requested resource; analyze the received command based at least in part on a context of the received command and the security policy; and based upon a determination that the received command is acceptable, transfer a communication corresponding to the command to the requested resource.

Turning to FIG. 1A, network architecture 100 is shown in accordance with some embodiments. In the context of network architecture 100, a stand-alone bridge server 110 provides security for accesses to an air-gapped resource 116 for traffic to/from, for example, a network element 104 coupled to a communication network 102. In addition, a combination of a bridge server 120 and a Domain Name System (DNS) server 124 provides security for accesses to an unadvertised cloud-based resource 136 for traffic to/from, for example, network element 104 coupled to a communication network 102. The security provided by bridge server 110 is performed at least in part by executing instructions included as part of a context based air-gap bridge application 112a. Similarly, the security provided by bridge server 110 is performed at least in part by executing instructions included as part of a context based air-gap bridge application 112b.

Unadvertised cloud-based resource 136 may be any network element, database, cloud command line interface, and/or application deployed as part of cloud service 132. Based upon the disclosure provided herein, one of ordinary skill in the art will recognize a variety of computers, applications, databases, and/or combinations thereof that may be deployed as unadvertised cloud-based resource 136. In addition to bridge server 120, access to unadvertised cloud-based resource 136 is also controlled by a cloud gateway 130 that is included with unadvertised cloud-based resource 136 in a cloud service 132. In some embodiments, cloud service 132 is a subscription based service that allows many parties to lease server space for a variety of network purposes. In such cases, the security provided by cloud gateway 130 is generalized to all subscribers to the cloud service 132. As such, the security provided by cloud gateway 132 is not as customizable as that provided by bridge server 120.

Communication network 102 may be any type of communication network known in the art. Those skilled in the art will appreciate that communication network 102 can be wireless network, a wired network, or a combination thereof that can be implemented as one of the various types of networks, such as an Intranet, a Local Area Network (LAN), a Wide Area Network (WAN), an Internet, and the like. Further, communication network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Coupling between DNS Server 124 and bridge server 120 may be a direct wired connection, a general network connection, a dedicated network connection, or the like. Based upon the disclosure provided herein, one of ordinary skill in the art will recognize a variety of communication connections and methods that may be used to connect DNS Server 124 and bridge server 120.

Figure 1B:
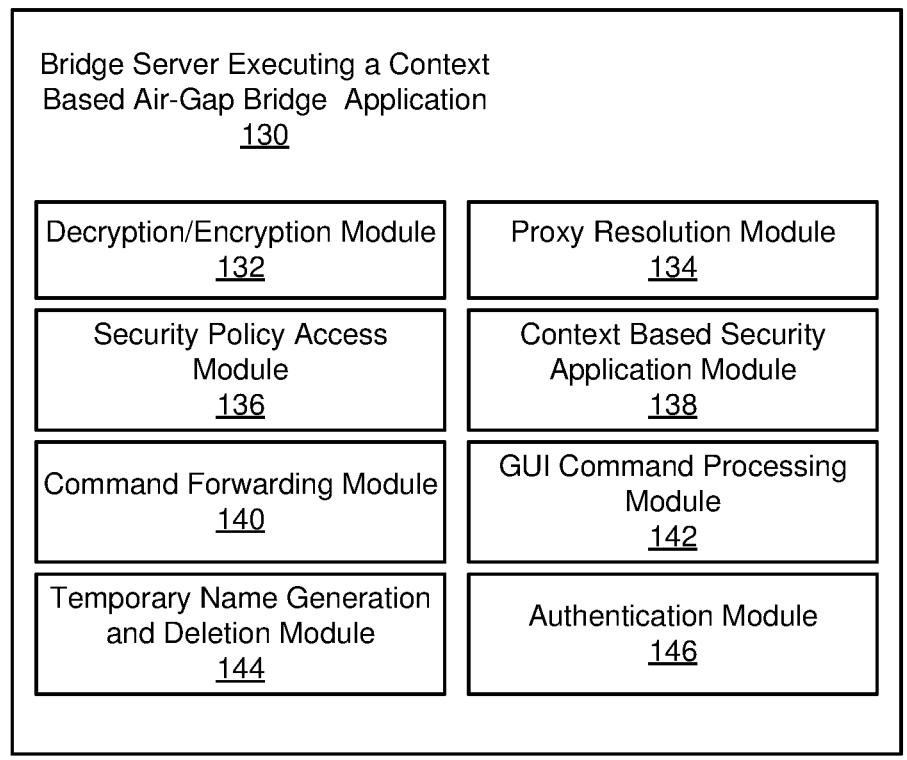

Turning to FIG. 1B, an example implementation of a bridge server (e.g., bridge server 110 or bridge server 120) executing a context based air-gap bridge application (e.g., context based air-gap bridge application 112) 130 is shown in accordance with some embodiments. As shown in this example, bridge server executing a context based air-gap bridge application 130 includes: a decryption/encryption module 132, a proxy resolution module 134, a security policy access module 136, a context based security application module 138, a command forwarding module 140, a GUI command processing module 142, a temporary name generation and deletion module 144, and an authentication module 146.

Decryption/encryption module 132 is configured to encrypt and decrypt information being passed via a communication network. As such, decryption/encryption module 132 may, for example, perform the functions discussed below in relation to block 208 and block 226 of FIG. 2. Proxy resolution module 134 is configured to resolve a proxy to an actual resource. As such, proxy resolution module 134 may, for example, perform the functions discussed below in relation to block 210 of FIG. 2. Security policy access module 136 is configured to access one or more security policies to be applied when evaluating access to an identified resource. As such, security policy access module 136 may, for example, perform the functions of block 212 of FIG. 2. Context based security plication module 138 is configured to apply a combination of a security policy governing access to a resource along with context. As such, context based security plication module 138 may, for example, perform the function of block 214 of FIG. 2. Command forwarding module 140 is configured to format and forward a command to an identified resource based upon acceptability of the command in light of the context based application of the security policy. As such, command forwarding module 140 may, for example, perform the functions of block 220 and block 222 of FIG. 2. GUI command processing module 142 is configured to process commands derived from a GUI interface and destined to a resource. As such, GUI command processing module 142 may, for example, perform the functions discussed below in relation to FIG. 5 or FIG. 6. Temporary name generation and deletion module 144 is configured to create temporary names in relation to accessing an unadvertised cloud-based resource, and rendering the temporary names unusable. As such, temporary name generation and deletion module 144 may, for example, perform the functions discussed below in relation to block 406 and block 413 of FIG. 4. Authentication module 146 is configured to authenticating a requesting user. As such, authentication module 146 may, for example, perform the functions discussed below in relation to block 410 and block 412 of FIG. 4.

Figure 1C:
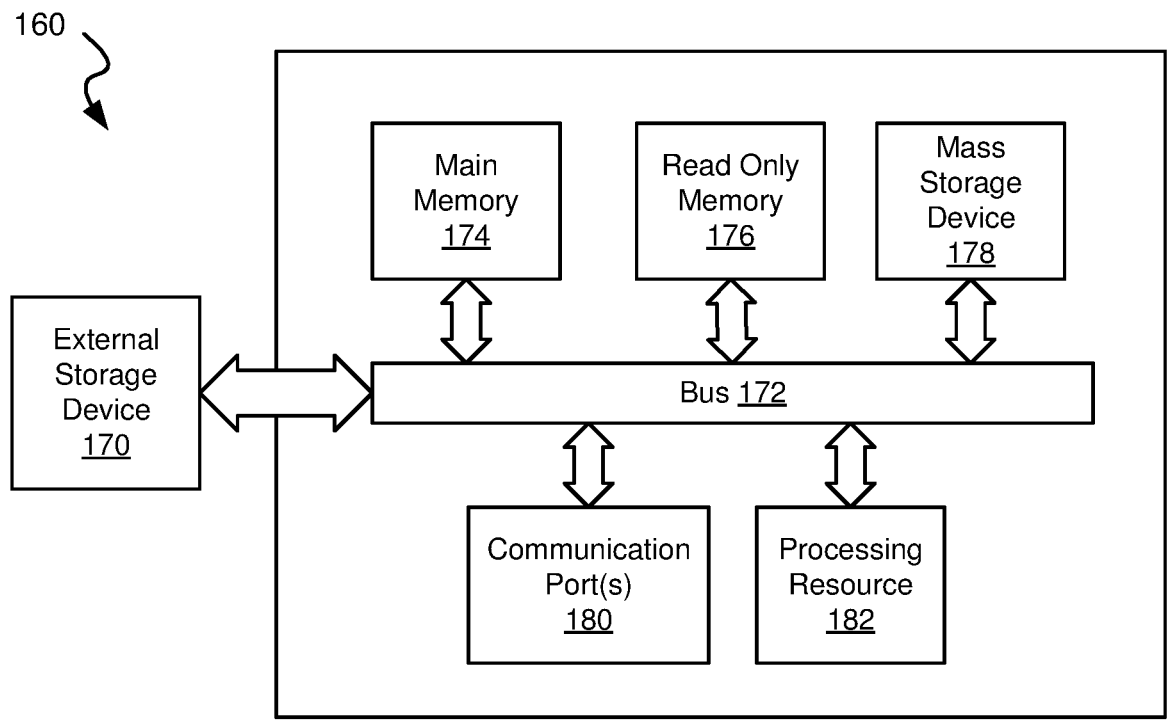

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
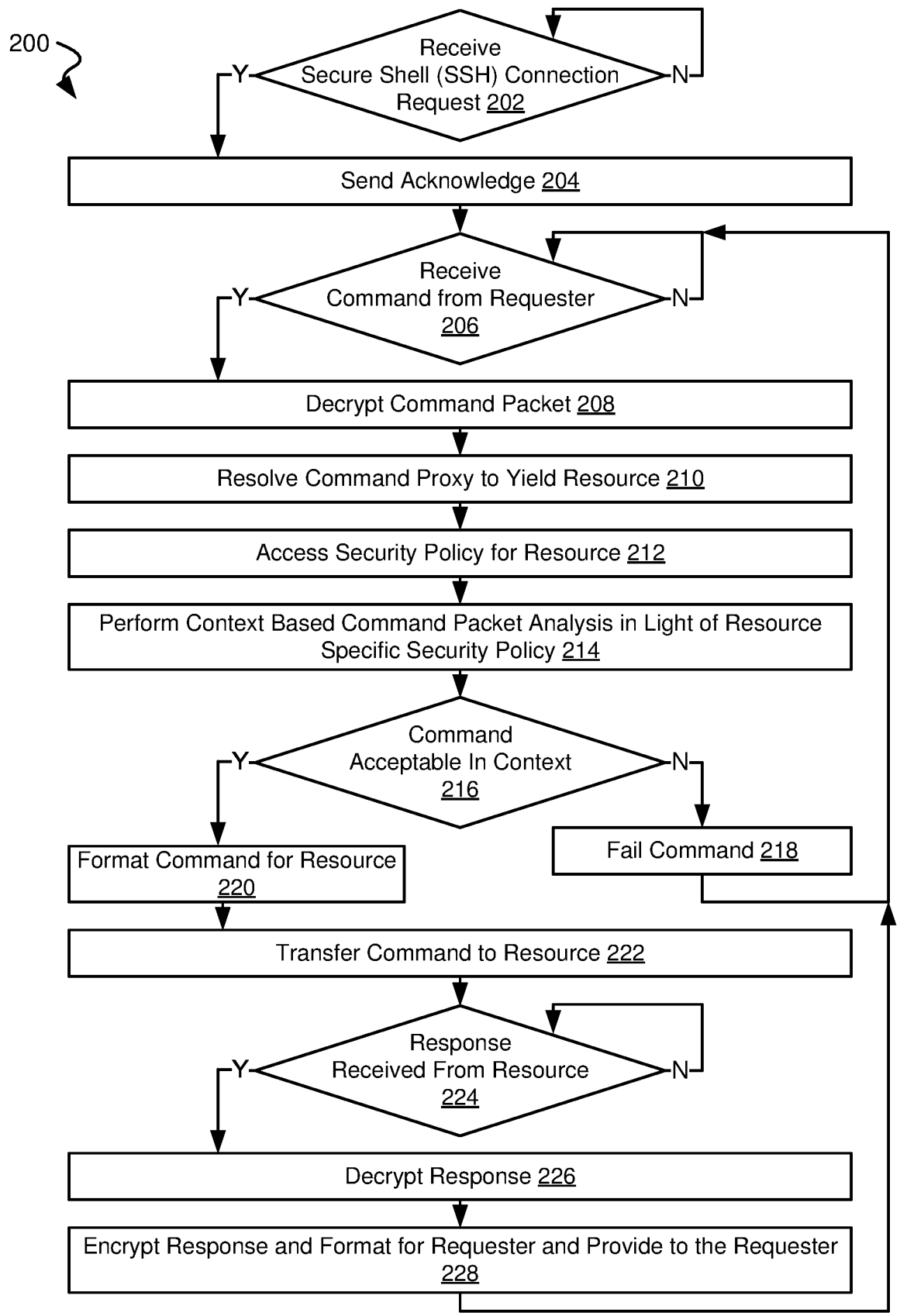
FIG. 2 is a flow diagram showing a method in accordance with some embodiments for providing context based security to an air-gapped network resource.

Turning to FIG. 2, a flow diagram 200 shows a method in accordance with some embodiments for providing context based security to an air-gapped network resource. Following flow diagram 200, a bridge server awaits reception of an SSH connection (block 202). An SSH request may be received from a variety of sources including, but not limited to, a network administrator directly accessing a bridge server that provides access to an air-gapped resource or from a network element coupled to the bridge server via a communication network, or direct serial connection into the air-gapped resource. Once an SSH request is received from a requester (block 202), an acknowledge message is sent from the bridge server to the requester (block 204). While not shown, the requester is authenticated to the bridge server. Such authentication may be single authentication or multi-part authentication. Such multi-part authentication may, for example, include use of out of band information (e.g., a code provided to the requester via the requester's mobile phone number). Based upon the disclosure provided herein, one of ordinary skill in the art will recognize a variety of approaches for authentication that may be used in relation to different embodiments.

The bridge server awaits a command from the requester (block 206). The command may be any command known in the art, and based upon the disclosure provided herein, one of ordinary skill in the art will recognize a variety of commands that may be received from the requester in relation to an attempt to access the air-gapped resource. The command packet of the received command is decrypted (block 208). Such decryption may be done using and decryption protocol or mechanism known in the art.

The bridge server resolves the address in the decrypted command to identify the resource to which the command is directed (block 210). The resource may be, for example, an air-gapped resource accessible via the bridge server or a cloud-based resource accessible via the bridge server. Using this information, the bridge server identifies a security policy specific to the subject resource (block 212). The bridge server then applies the security policy to the command and the context of the command (block 214). The security policy may include a variety of context based decisions including, but not limited to, a combination of the identity of the requester, the origination of the command, the time of the command submission, and/or an intent of the command. The intent of the command may be based upon, for example, the type of resource being accessed, the volume of the access, and/or the nature of the command (such as with create, read, update, and delete ("CRUD")). Based upon the disclosure provided herein, one of ordinary skill in the art will recognize a variety of context information and/or combinations of context information that may be incorporated in a security policy. As an example, a relatively strict security policy will allow access only by a defined requester accessing the bridge server directly during a time period (e.g., during business hours or during a time coinciding with a major outage or service-impacting event, where help from an MSP is needed and provisions for access are preconfigured and implicit in the policy) where the requester is expected to be making such an access attempt, and only for areas and/or operations of the accessed resource specifically designated as accessible to the requester. As another example, a relatively loose security policy will allow access only by a defined requester only for areas and/or operations of the accessed resource specifically designated as accessible to the requester (e.g., during business hours or during a time coinciding with a major outage or service-impacting event, where help from an MSP is needed and provisions for access are preconfigured and implicit in the policy). By doing such, context based security is added to a standard bridge server. Based upon the disclosure provided herein, one of ordinary skill in the art will recognize a variety security policies that may be employed in the bridge server to govern access to one or more air-gapped resources protected by the bridge server.

Based upon application of the security policy to the command and command context, the bridge server determines whether the command is acceptable in the context (block 216). Where the command is not acceptable (i.e., for some reason the command violates the resource specific security policy or the requester is not a member of an approved user group for the command submitted)(block 216), the bridge server fails the command (block 218) and processing returns to await a subsequent command.

Alternatively, where the command is acceptable (block 216), the command is formatted for the resource (block 220). This may include making any changes necessary for the resource to recognize and process the command including, but not limited to, including the address of the resource and/or encrypting the command package. The command is then transferred from the bridge server to the resource (block 222) after which the bridge server awaits a response to the command from the resource (block 224). Once a response is received from the resource (block 224), the response is decrypted (block 226). The decrypted response is then formatted for the requester and provided to the requester from the bridge server (block 228).

Figure 3:
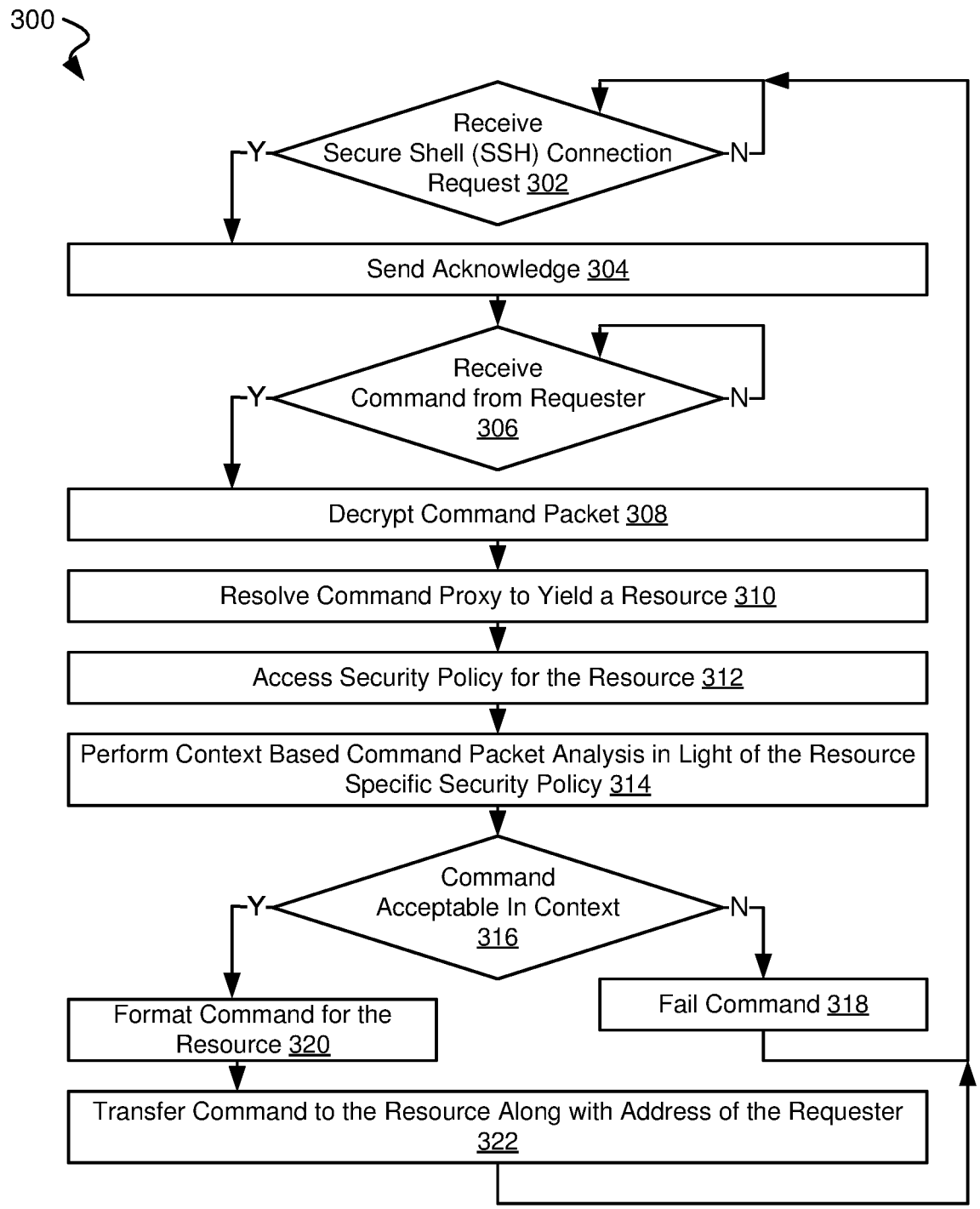
FIG. 3 is a flow diagram showing a method in accordance with other embodiments for providing context based security to an air-gapped network resource.

Turning to FIG. 3, a flow diagram 300 shows a method in accordance with other embodiments for providing context based security to an air-gapped network resource. Following flow diagram 300, a bridge server awaits reception of an SSH connection (block 302). An SSH request may be received from a variety of sources including, but not limited to, a network administrator directly accessing a bridge server that provides access to an air-gapped resource or from a network element coupled to the bridge server via a communication network. Once an SSH request is received from a requester (block 302), an acknowledge message is sent from the bridge server to the requester (block 304). Like in flow diagram 200, while not shown, the requester is authenticated to the bridge server. Such authentication may be single authentication or multi-part authentication. Such multi-part authentication may, for example, include use of out of band information (e.g., a code provided to the requester via the requester's mobile phone number). Based upon the disclosure provided herein, one of ordinary skill in the art will recognize a variety of approaches for authentication that may be used in relation to different embodiments.

The bridge server awaits a command from the requester (block 306). The command may be any command known in the art, and based upon the disclosure provided herein, one of ordinary skill in the art will recognize a variety of commands that may be received from the requester in relation to an attempt to access the air-gapped resource. The command packet of the received command is decrypted (block 308). Such decryption may be done using and decryption protocol or mechanism known in the art.

The bridge server resolves the address in the decrypted command to identify the resource to which the command is directed (block 310). The resource may be, for example, an air-gapped resource accessible via the bridge server. Using this information, the bridge server identifies a security policy specific to the subject resource (block 312). The bridge server then applies the security policy to the command and the context of the command (block 314). The security policy may include a variety of context based decisions including, but not limited to, a combination of the identity of the requester, the origination of the command, the time of the command, and/or an intent of the command. The intent of the command may be based upon, for example, the type of resource being accessed and/or the volume of the access. Based upon the disclosure provided herein, one of ordinary skill in the art will recognize a variety of context information and/or combinations of context information that may be incorporated in a security policy.

Based upon application of the security policy to the command and command context, the bridge server determines whether the command is acceptable in the context (block 316). Where the command is not acceptable (i.e., for some reason the command violates the resource specific security policy)(block 316), the bridge server fails the command (block 318), a generic notification indicating nature of failure is sent back to the requester and processing returns to await a subsequent command.

Alternatively, where the command is acceptable (block 316), the command is formatted for the resource (block 320). This may include making any changes necessary for the resource to recognize and process the command including, but not limited to, including the address of the resource and/or encrypting the command package. The command is then transferred from the bridge server to the resource along with the address of the requester (block 322). This allows for direct communication between the requester and the resource.

Figure 4:
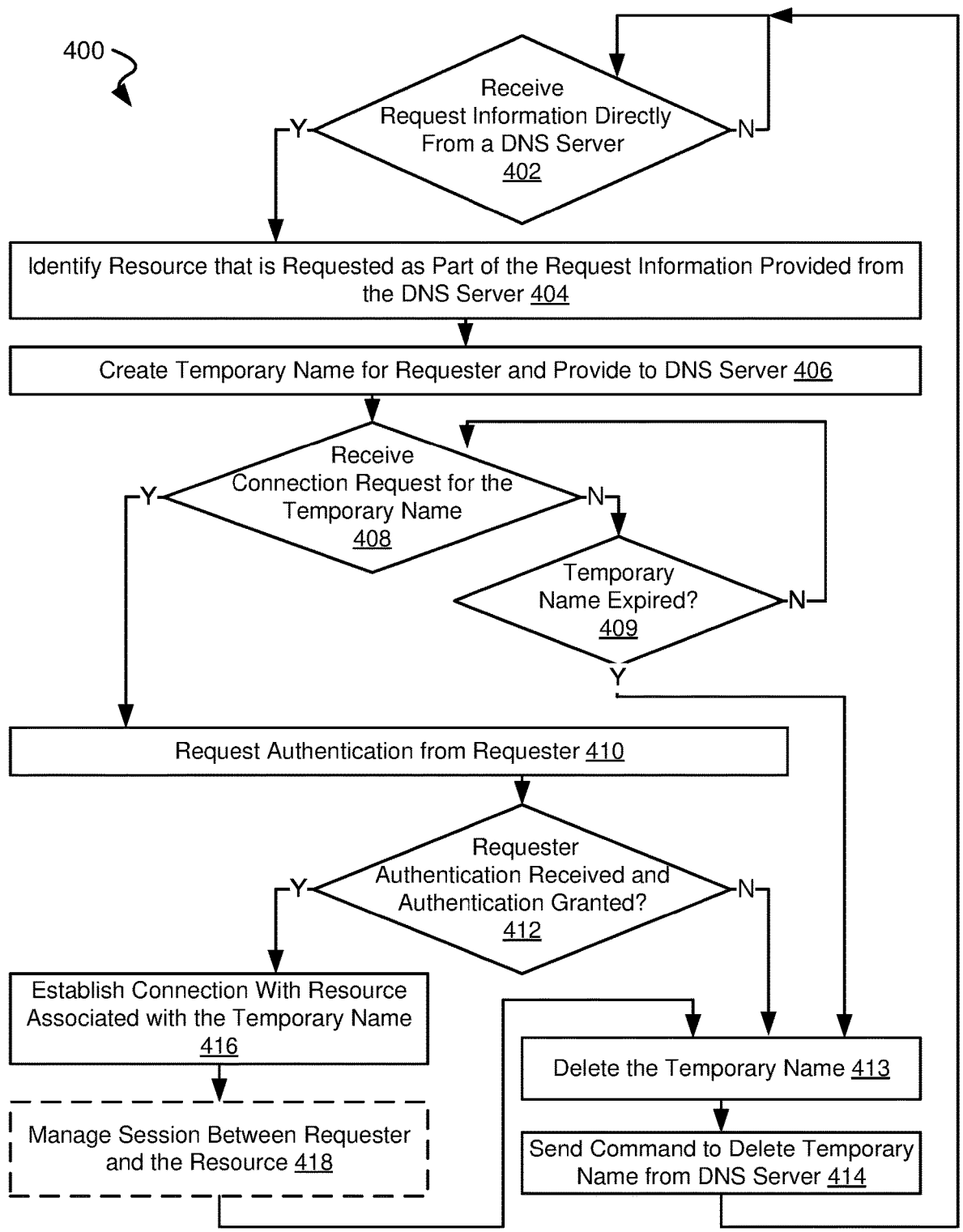
FIGS. 4-6 are flow diagrams showing methods in accordance with various embodiments for providing security to unadvertised cloud-based resources.

Turning to FIG. 4, a flow diagram 400 shows a method in accordance with some embodiments for providing security to unadvertised cloud-based resources. Following flow diagram 400, a user sends a request to access an unadvertised cloud-based resource where an attempt to resolve the name of the unadvertised cloud-based resource is made by a DNS server that is communicably coupled to a bridge server. The request includes a proxy name of a resource of which the DNS server is aware, but cannot resolve without interaction with bridge server because the resource is not advertised or because the user does not have access through traditional means to access the cloud-based resource, such as a user account created directly on the cloud-based resource. As such, the DNS server will communicate with the bridge server to facilitate resolution of the name.

The bridge server awaits request information derived directly from the DNS server (block 402). This request may be made, for example, over a dedicated management communication link shared between the bridge server and the DNS server. Based upon the disclosure provided herein, one of ordinary skill in the art will recognize a variety of communication approaches and/or physical mechanisms that may be used to facilitate communications between the DNS server and the bridge server in accordance with different embodiments.

When a request is received from the DNS server (block 402), the bridge server identifies the unadvertised cloud-based resource corresponding to the proxy name in the request received from the DNS server (block 404). This may be done using, for example, a look-up table maintained in the bridge server of unadvertised cloud-based resources over which it governs access. The bridge server creates a temporary name for the resource (block 406). This temporary name may be anything that the bridge server may use over a subsequent period of time to direct access to the appropriate unadvertised cloud-based resource. In some cases, the temporary name is a randomly generated number that is created and stored by the bridge server for a defined time limit. Based upon the disclosure provided herein, one of ordinary skill in the art will recognize a variety of temporary names and/or approaches for generating temporary names that may be used in relation to different embodiments. The DNS server will provide this temporary name to the requester as a resolved name.

The bridge server then waits to receive a connection request from a requester that includes the temporary name (block 408). Presumably any request using the temporary name will be coming from the requester which received the temporary name from the DNS server, but this may not be so where someone has illegitimately intercepted the communication between the DNS server and the requester. Even if someone has illegitimately intercepted the temporary name, it is of limited value because the temporary name is only valid for a limited time period and additionally requires authentication of a requester using either a temporary or aliased user name which doesn't actually exist on the target resource. As such, the bridge server monitors the validity duration of the issued temporary name (block 409). Once the time period that the temporary name is valid expires (block 409), the bridge server deletes the temporary name (block 413) and sends a command to the DNS server to similarly delete the temporary name (block 414). At this juncture the temporary name is of no value to anyone—legitimate or not.

Where the bridge server receives a connection request using the temporary name (block 408), a request for the requester to authenticate is issued to the requester (block 410). Such authentication may be single authentication or multi-part authentication. Such multi-part authentication may, for example, include use of out of band information (e.g., a code provided to the requester via the requester's mobile phone number). Based upon the disclosure provided herein, one of ordinary skill in the art will recognize a variety of approaches for authentication that may be used in relation to different embodiments. Where the requester cannot properly authenticate (block 412), after a threshold of violations has been breached, the bridge server deletes the temporary name (block 413) and sends a command to the DNS server to similarly delete the temporary name (block 414). At this juncture the temporary name is of no value to anyone—legitimate or not.

Alternatively, where the requester does properly authenticate (block 412), a connection is established between the bridge server and the unadvertised cloud-based resource associated with the temporary name (block 416), and the bridge server proxies the connection with the original requesting workstation, over the Internet or other network type. With the connection established (block 416), the bridge server manages the connection (block 418). Block 418 is shown in dashed lines as it may include, for example, the processes described below in relation to one or both of FIG. 5 and/or FIG. 6. Once the session completes (block 418), the bridge server deletes the temporary name (block 413) and sends a command to the DNS server to similarly delete the temporary name (block 414). At this juncture the temporary name is of no value to anyone—legitimate or not.

Figure 5:
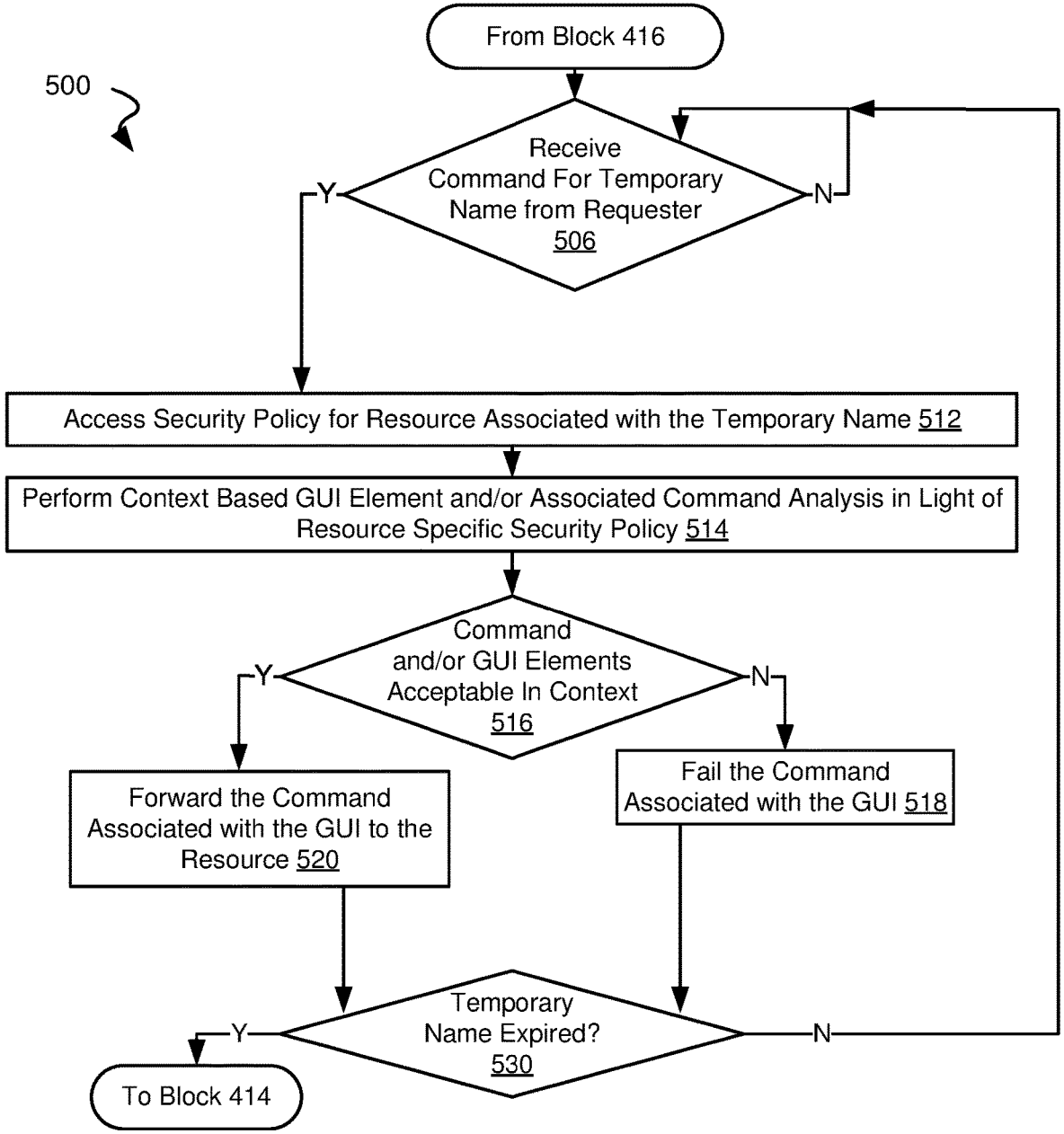

Turning to FIG. 5, one embodiment of managing the session that may be used in place of block 418 in accordance with some embodiments is shown in a flow diagram 500. Following flow diagram 500, the bridge server awaits a command from a requester that indicates the temporary name (block 506). The command or graphical user interface (GUI) interaction may be any command or be associated with any command known in the art, and based upon the disclosure provided herein, one of ordinary skill in the art will recognize a variety of commands that may be received from the requester in relation to an attempt to access the air-gapped resource.

The bridge server identifies a security policy specific to the subject unadvertised cloud-based resource (block 512). The bridge server then applies the security policy to the GUI elements available to the user on the cloud-based resource (block 514). The security policy may include a variety of context based decisions including, but not limited to, a combination of the identity of the requester, the origination of the command, the time of the command, and/or an intent of the command. The intent of the command may be based upon, for example, the type of resource being accessed and/or the volume of the access. Based upon the disclosure provided herein, one of ordinary skill in the art will recognize a variety of context information and/or combinations of context information that may be incorporated in a security policy.

Based upon application of the security policy to the GUI elements or the command associated with the GUI, the bridge server determines whether the GUI elements and command are acceptable in the context (block 516). Where the GUI interaction (command and/or GUI elements) is not acceptable (i.e., for some reason the GUI elements and/or associated command violate the resource specific security policy)(block 516), the bridge server fails the GUI interaction (block 518). Alternatively, where the GUI interaction (command and/or GUI elements) is acceptable (block 516), the command or GUI interaction is allowed to process (block 520).

It is determined whether the temporary name expired (block 530). Once the time period that the temporary name is valid expires (block 530), processing is returned to block 414 of FIG. 4. Alternatively, where the temporary name has not yet expired (block 530), processing returns to await a subsequent command from the requester (block 506).

Figure 6:
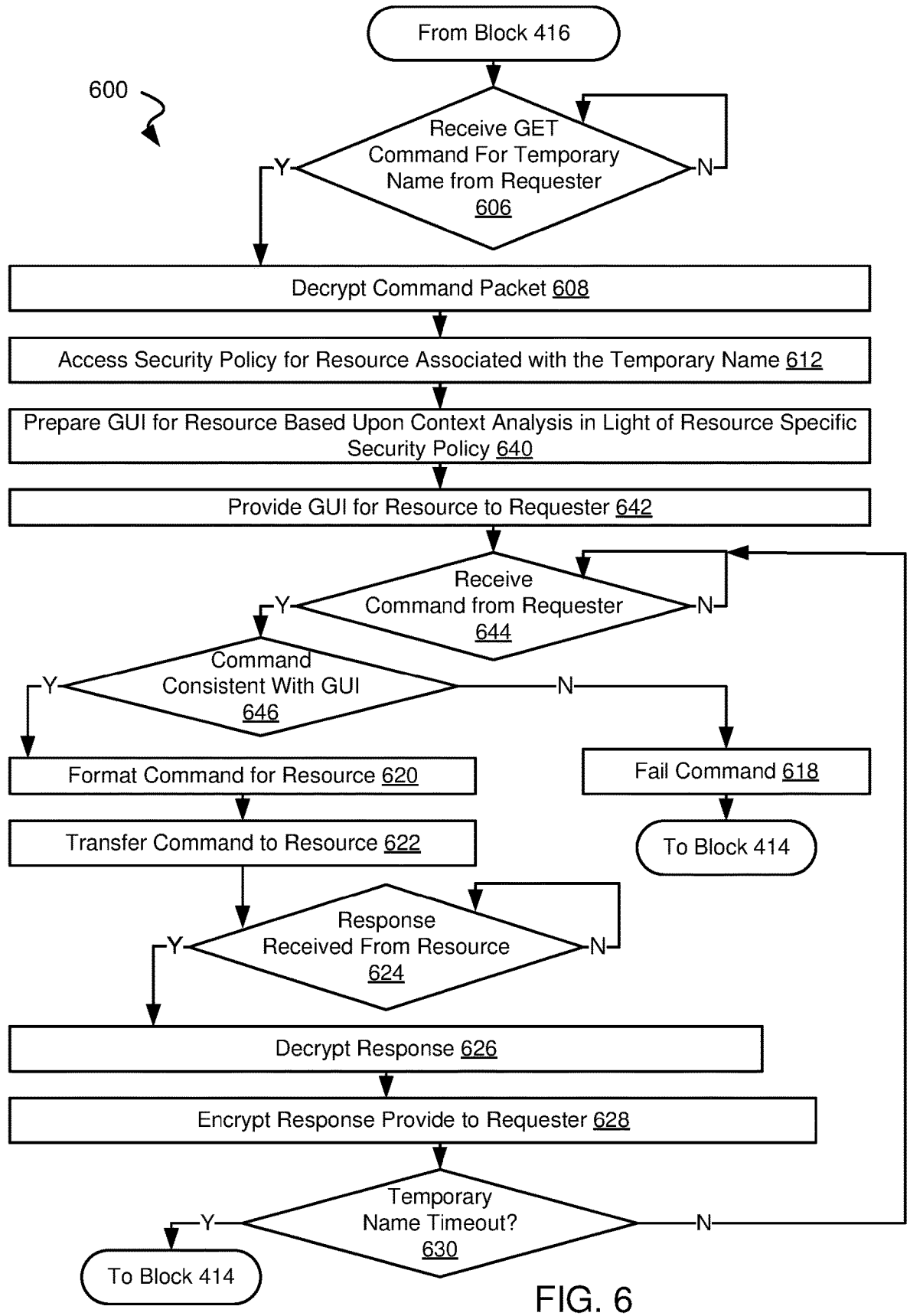

Turning to FIG. 6, another embodiment of managing the session that may be used in place of block 418 in accordance with some embodiments is shown in a flow diagram 600. Following flow diagram 600, it is determined whether the bridge server received a GET command using the temporary name (block 606). The command packet of the received command is decrypted (block 608). Such decryption may be done using and decryption protocol or mechanism known in the art.

The bridge server identifies a security policy specific to the subject unadvertised cloud-based resource (block 612). The bridge server then generates a GUI based upon a context analysis in light of the resource specific security policy (block 640). The generated GUI will present a user interface to the requester that advertises only those commands available to the requester in their context. Thus, for example, where the requester is accessing the unadvertised resource from a terminal directly wired to the bridge server during hours that the requester is expected to be using the system, the GUI may present all features supported by the resource. Alternatively, where the same requester is accessing outside of the window of time that they are expected to be accessing the resource or from a network element that is not directly connected to the bridge server, the GUI may present only a subset of the features supported by the resource where the subset of features is dictated by the security policy specific to the resource. The security policy may include a variety of context based decisions including, but not limited to, a combination of the identity of the requester, the origination of the command, the time of the command, and/or an intent of the command. The intent of the command may be based upon, for example, the type of resource being accessed and/or the volume of the access. Based upon the disclosure provided herein, one of ordinary skill in the art will recognize a variety of context information and/or combinations of context information that may be incorporated in a security policy and/or a variety security policies that may be employed in the bridge server to govern access to one or more unadvertised cloud-based resources protected by the bridge server.

The GUI is provided to the requester such that the requester can use to GUI to select a command directed at the unadvertised cloud-based resource (block 642). The bridge server then awaits receipt of a command from the requester (block 614). Once a command is received (block 644), it is determined whether the received command was a command consistent with the GUI (block 646). For example, where the GUI provides an ability for the requester to select one of three functions supported by the unadvertised cloud-based resource, the bridge server determines whether the received command is one of the three commands. Where the command is not consistent with the GUI (block 646), the command is failed (block 618) and the processing is returned to block 414 of FIG. 4.

Alternatively, where the command is consistent with the GUI (block 646), the command is formatted for the unadvertised cloud-based resource (block 620). This may include making any changes necessary for the unadvertised cloud-based resource to recognize and process the command including, but not limited to, including the address of the unadvertised cloud-based resource and/or encrypting the command package. The command is then transferred from the bridge server to the unadvertised cloud-based resource (block 622) after which the bridge server awaits a response to the command from the unadvertised cloud-based resource (block 624). Once a response is received from the resource (block 524), the response is decrypted (block 626). The decrypted response is then formatted for the requester and provided to the requester from the bridge server (block 628). It is then determined whether the temporary name expired (block 630). Once the time period that the temporary name is valid expires (block 630), processing is returned to block 414 of FIG. 4. Alternatively, where the temporary name has not yet expired (block 630), processing returns to await a subsequent command from the requester (block 644).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for providing access to an unadvertised cloud-based resource, the method comprising:
    receiving, by a bridge server, a request to access a proxy from a first network entity;
    creating, by the bridge server, a temporary name to be used in relation to accessing a resource corresponding to the proxy, wherein the resource is an air-gapped resource that is accessible to an outside network only via the bridge server;
    receiving, by the bridge server, a request to access the resource from a second network entity, wherein the request includes the temporary name;
    requesting, by the bridge server, authentication from the second network entity; and
    based upon an acceptable authentication received from the second network entity, establishing a connection with the resource.

2. The method of claim 1, wherein the connection with the resource is established directly between the resource and the second network entity.

3. The method of claim 1, wherein the connection with the resource is established indirectly between the resource and the second network entity with information flowing through the bridge server that includes the processing resource.

4. The method of claim 1, wherein the first network entity is a domain name server.

5. The method of claim 1, wherein the request to access the proxy from the first network entity is a first request to access the proxy from the first network entity, wherein the temporary name to be used in relation to accessing the resource corresponding to the proxy is a first temporary name to be used in relation to accessing the resource corresponding to the proxy, wherein the request to access the resource is a first request to access the resource, the method further comprising:
    receiving, by the bridge server, a second request to access the proxy from the first network entity;
    creating, by the bridge server, a second temporary name to be used in relation to accessing the resource corresponding to the proxy;
    receiving, by the bridge server, a second request to access the resource from a third network entity, wherein the second request includes the second temporary name;
    requesting, by the bridge server, authentication from the third network entity; and
    based upon a failed authentication received from the third network entity, rendering, by the bridge server, the second temporary name unusable.

6. The method of claim 5, wherein rendering the second temporary name unusable includes deleting the second temporary name.

7. The method of claim 1, the method further comprising:
    determining, by the bridge server, a time-based expiration of the temporary name; and
    rendering, by the bridge server, the temporary name unusable.

8. The method of claim 1, the method further comprising:
    providing, by the bridge server, the temporary name to the first network entity for forwarding by the first network entity to the second network entity.

9. The method of claim 1, wherein the actual name of the resource is never revealed to the second network entity.

10. The method of claim 1, wherein the actual name of the resource is never revealed to the first network entity.

11. A bridge server for providing access to an unadvertised cloud-based resource, the bridge server comprising:
    a processing resource;
    a non-transitory computer readable medium coupled to the processing resource and having stored therein instructions that when executed by the processing resource cause the processing resource to:
        receive a request to access a proxy from a first network entity;

create a temporary name to be used in relation to accessing a resource corresponding to the proxy, wherein the resource is an air-gapped resource that is accessible to an outside network only via the bridge server;

receive a request to access the resource from a second network entity, wherein the request includes the temporary name;

request authentication from the second network entity; and based upon an acceptable authentication received from the second network entity, establish a connection with the resource.

12. The bridge server of claim 11, wherein the connection with the resource is established directly between the resource and the second network entity.

13. The bridge server of claim 11, wherein the connection with the resource is established indirectly between the resource and the second network entity with information flowing through a bridge server that includes the processing resource, and wherein the actual name of the resource is never revealed to the second network entity.

14. The bridge server of claim 11, wherein the first network entity is a domain name server.

15. The bridge server of claim 11, wherein the request to access the proxy from the first network entity is a first request to access the proxy from the first network entity, wherein the temporary name to be used in relation to accessing the resource corresponding to the proxy is a first temporary name to be used in relation to accessing the resource corresponding to the proxy, wherein the request to access the resource is a first request to access the resource, and wherein the instructions further cause the processing resource to:

receive a second request to access the proxy from the first network entity;

create a second temporary name to be used in relation to accessing the resource corresponding to the proxy;

receive a second request to access the resource from a third network entity, wherein the second request includes the second temporary name;

request authentication from the third network entity; and based upon a failed authentication received from the third network entity, render the second temporary name unusable.

16. The bridge server of claim 15, wherein rendering the second temporary name unusable includes deleting the second temporary name.

17. The bridge server of claim 11, wherein the instructions bridge server further cause the processing resource to:

determine a time-based expiration of the temporary name; and render the temporary name unusable.

18. The bridge server of claim 11, wherein the instructions further cause the processing resource to:

provide the temporary name to the first network entity for forwarding by the first network entity to the second network entity.

19. The bridge server of claim 1, wherein the actual name of the resource is never revealed to the first network entity.

20. A non-transitory computer readable medium having stored therein instructions that when executed by a processing resource of a bridge server cause the processing resource to:

receive a request to access a proxy from a first network entity;

create a temporary name to be used in relation to accessing a resource corresponding to the proxy, wherein the resource is an air-gapped resource that is accessible to an outside network only via the bridge server;

receive a request to access the resource from a second network entity, wherein the request includes the temporary name;

request authentication from the second network entity; and based upon an acceptable authentication received from the second network entity, establish a connection with the resource.

* * * * *